United States Patent [19]

Blaha

[11] 3,929,041
[45] Dec. 30, 1975

[54] WIRE ALIGNING DEVICE FOR USE WITH A WIRE STRIPPING MACHINE

[75] Inventor: Gerald E. Blaha, Waukesha, Wis.

[73] Assignee: Artos Engineering Company, New Berlin, Wis.

[22] Filed: Mar. 12, 1975

[21] Appl. No.: 557,619

[52] U.S. Cl. .................................................. 81/9.51
[51] Int. Cl.² ........................................... H02G 1/12
[58] Field of Search ....................................... 81/9.51

[56] References Cited
UNITED STATES PATENTS

| | | | |
|---|---|---|---|
| 3,530,746 | 9/1970 | Gudmestad | 81/9.51 |
| 3,881,374 | 5/1975 | Gudmestad | 81/9.51 |

*Primary Examiner*—Al Lawrence Smith
*Assistant Examiner*—Roscoe V. Parker
*Attorney, Agent, or Firm*—James E. Nilles

[57] ABSTRACT

A wire aligning means for use with an insulation stripping machine including means to receive the end of an insulated wire and to position the wire such that it may be aligned with an insulation stripper head for removal of the insulation from the wire. The wire aligning device includes a pivotable wire guide means connected to a vertically reciprocating wire clamping means in such a manner that movement of the clamping means causes actuation of the wire guide means. The wire clamping means is operably connected to a pneumatic actuator which supplies vertical clamping force to the clamping means, and the wire guide is connected by pivotable linkage means to the clamping means such that downward vertical movement of the clamping means causes the wire guide to pivot about a horizontal axis. During the pivotal movement of the wire guide a pair of fingers which define a slot receive the wire and move axially along the length of the wire straightening the wire and aligning it with the cutting chamber of the rotary stripping machine.

9 Claims, 8 Drawing Figures

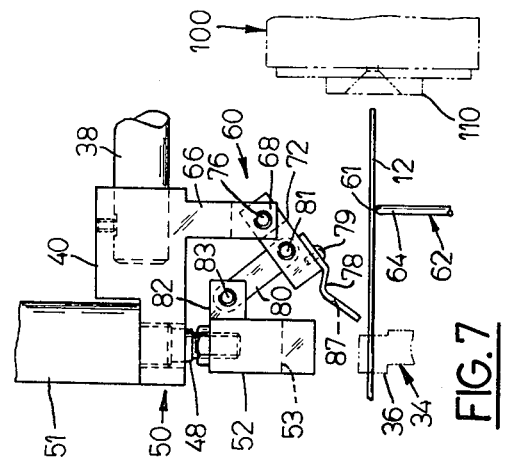
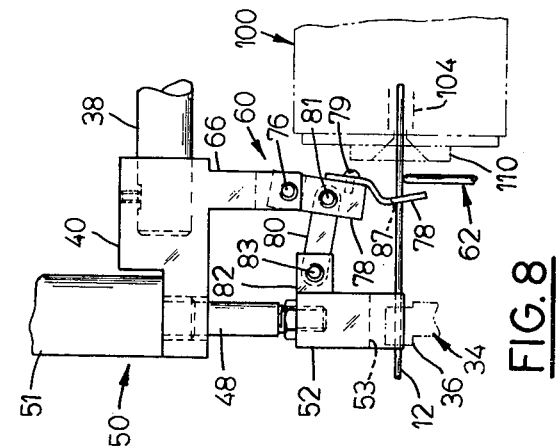
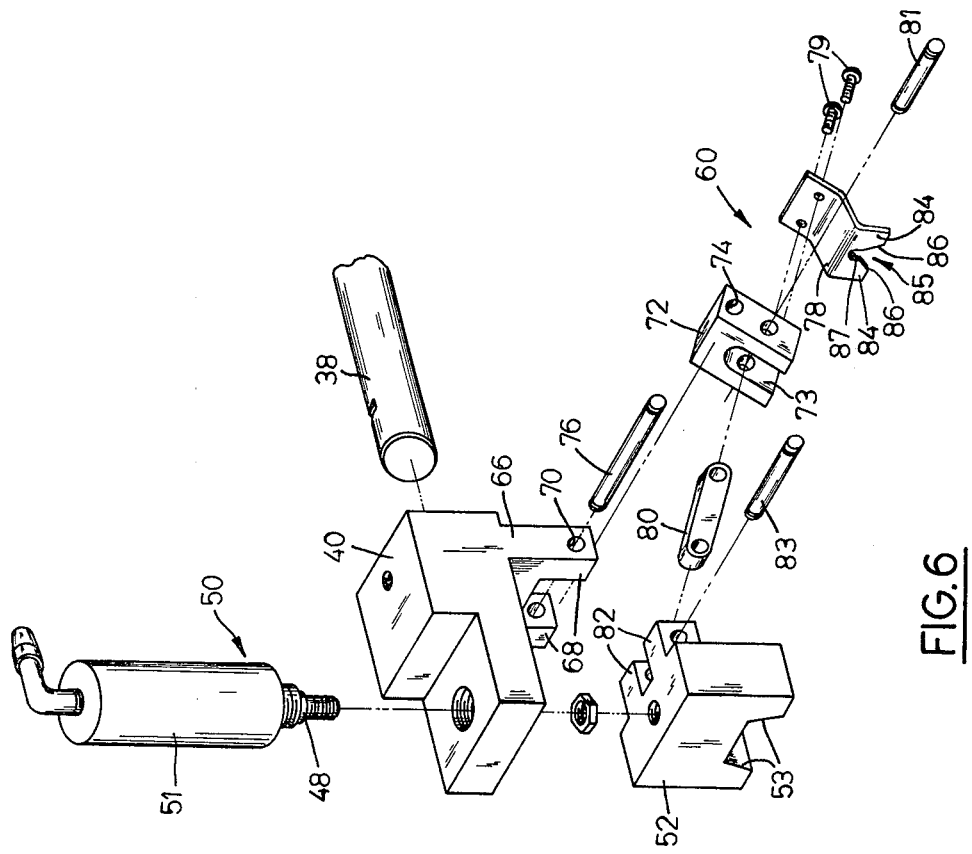

WIRE ALIGNING DEVICE FOR USE WITH A WIRE STRIPPING MACHINE

BACKGROUND OF THE INVENTION

This invention relates to wire aligning devices for use with wire stripping machines which remove the insulation from the ends of wires. The invention includes improvements in wire aligning means as shown in U.S. application Ser. No. 473,274, filed May 24, 1974 by Gudmestad, entitled "Rotary Wire Stripper" and issued May 6, 1975 as U.S. Pat. No. 3,881,374, and can be used in the environment of the rotary stripper shown in U.S. application Ser. No. 524,395, filed Nov. 18, 1974 by Blaha and copending with this application, the applications referred to above being assigned to a common assignee with the instant application.

SUMMARY OF THE INVENTION

The present invention is directed to an assembly for receiving and aligning the end of an insulated wire with a cutting head of an insulation stripping machine in such a manner that the wire is positioned to be received by the cutting apparatus of the stripping machine.

The wire aligning means of the present invention is designed to be used with a wire cutting and conveying machine which incorporates a wire insulation stripping apparatus. Following cutting and conveying of a section of wire and before it can be received within an insulation stripping machine, it may be necessary that the end of the wire be straightened so that it may be received within the stripping machine.

The wire aligning means of the present invention includes a lower wire support apparatus having an upper surface for supporting the free end of the wire operating in combination with a pivotable wire guide member which has a lower portion including two fingers which define a notch or a slot for receiving an insulated wire. The pivotable wire guide is operably connected to a downwardly movable wire clamping device which is used to firmly clamp the wire in place such that a free end of the wire will extend toward the stripping machine but preventing any movement of the wire during the stripping operation. The wire guide is connected to the clamping device such that, as the clamping device moves downwardly to secure the wire, the wire guide pivots downwardly toward the wire about a generally horizontal axis in such a manner that the fingers transverse either side of the wire along part of its axial length and move from the clamping member toward the outwardly extending end of the wire straightening the wire and accurately aligning the end of the wire with the stripping machine. During the pivotal movement of the wire guide, the finger members first move downwardly on either side of that portion of the wire which is adjacent to the wire clamping means, and as the wire guide continues to move through its arcuate motion toward the free end of the wire the wire is received and straightened by the narrow portion of the notch defined by the fingers. Even if the wire has in some manner been substantially bent, the wire guide is still assured to receive the wire between its fingers because it first receives the wire at that portion of the wire adjacent the clamp means.

BRIEF DESCRIPTION OF THE DRAWINGS

FIG. 6 is an exploded view of the elements of the wire guide apparatus of the present invention;

FIG. 7 is a side elevation view of the wire guide taken along line 7—7 in FIG. 4; and FIG. 8 is a side elevation view of the wire guide taken along line 8—8 in FIG. 5.

DESCRIPTION OF A PREFERRED EMBODIMENT

Figure 1:
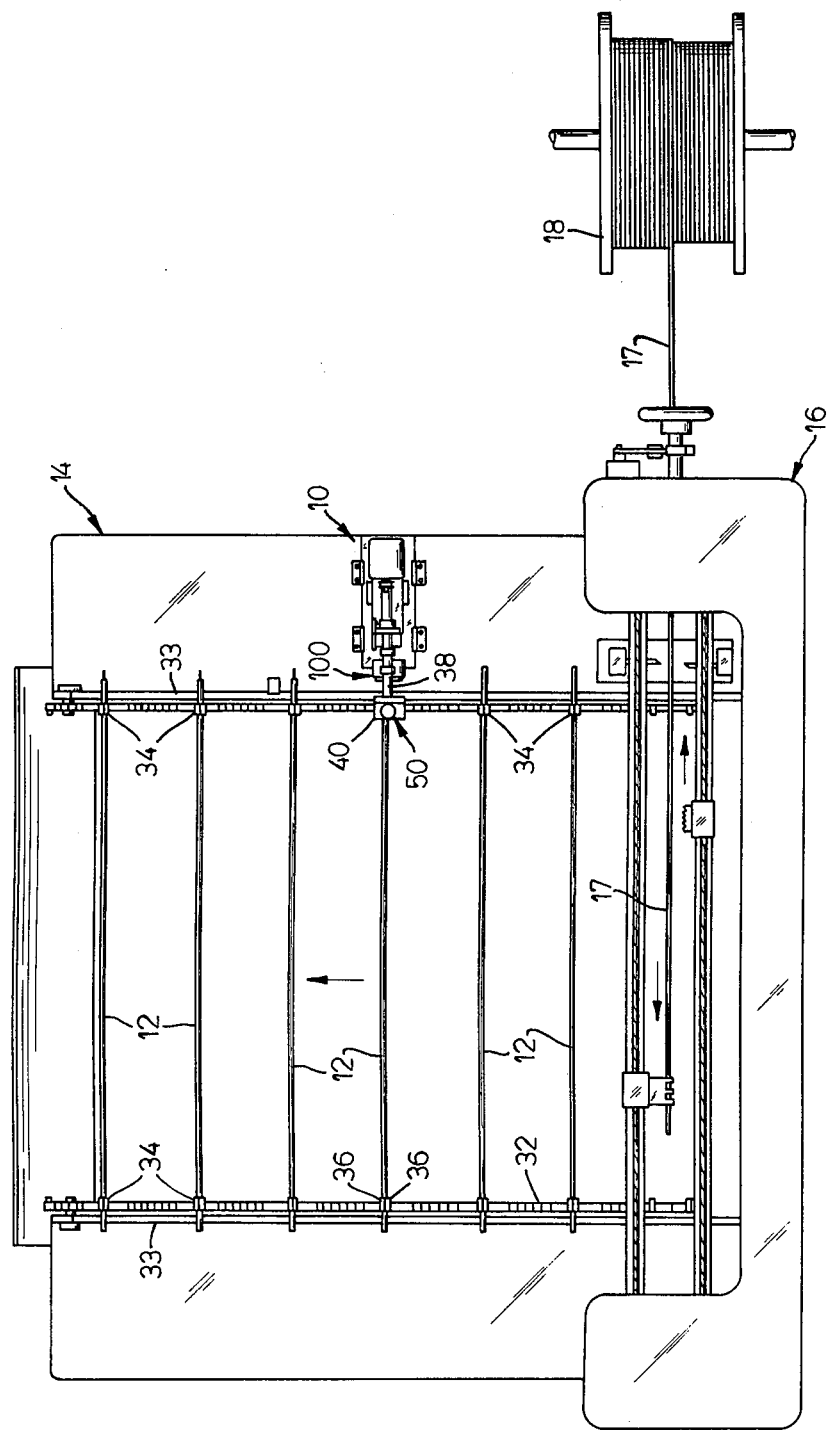
FIG. 1 is a plan view of a wire cutting and conveying machine and of a stripping apparatus which incorporates the wire aligning device of the present invention.

FIG. 1 generally shows a wire cutting, conveying and stripping apparatus which can advantageously employ the wire aligning means of the present invention. The apparatus shown in FIG. 1 generally includes a wire feeding and cutoff machine 16, a wire conveying mechanism 14 and a rotary stripper assembly 10 for removing the insulation from the end of a wire. The apparatus of the present invention includes means to align the end of an insulated wire 12 which is supported by the conveying mechanism 14 in such a manner that it can be readily received in the rotary stripper assembly 10.

In the apparatus shown in FIG. 1 wire members 12 are advanced in succession along a path by a wire conveying machine 14 which receives wire members 12 in wire grippers 34 from a wire feeding and cutoff machine shown generally as 16. The machine 16 operates to withdraw the end of an insulated wire 17 from a supply on a reel 18 and to cut off a predetermined length of the wire so that it may be conveyed by conveyor 14 to a rotary stripper machine 10. The conveyor 14 and wire feeding and cutoff machine 16 are generally of the type shown and described in detail in U.S. Pat. No. 3,029,494 and in U.S. application Ser. No. 473,274, filed May 24, 1974 by Gudmestad and issued May 6, 1975 as U.S. Pat. No. 3,881,374.

The conveyor 14 for receiving the cut lengths of wire or wire members 12 includes a pair of endless conveyor chains 32 which are simultaneously driven in a suitable manner in timed relation with the wire feeding and cutoff mechanism 16 to intermittently advance the wire members 12 from one station to another. Each of the chains 32 carries a series of wire grippers 34 spaced apart equal distances to maintain the wire members 12 in parallel relationship as they travel from one work station to another.

Figure 5:
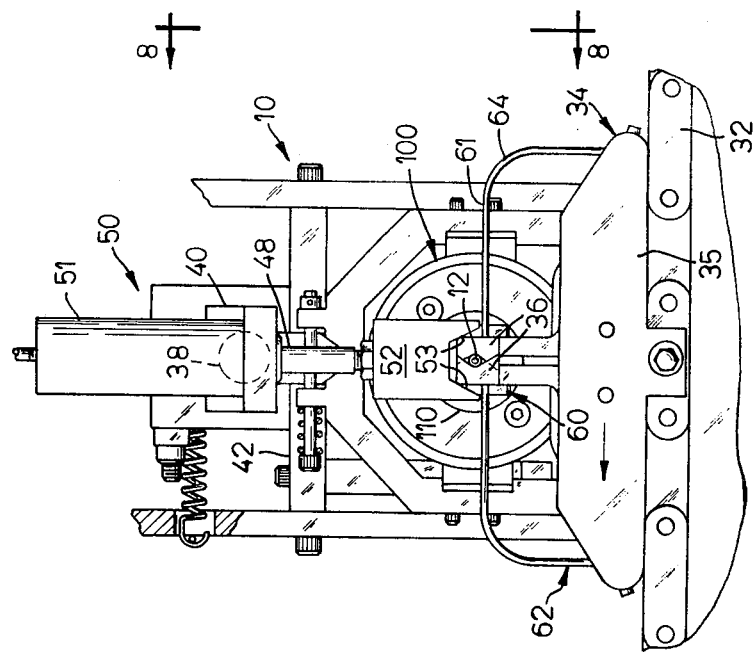
FIG. 5 is a view similar to that shown in FIG. 4 but showing the clamp apparatus in the engaged position.
Figure 4:
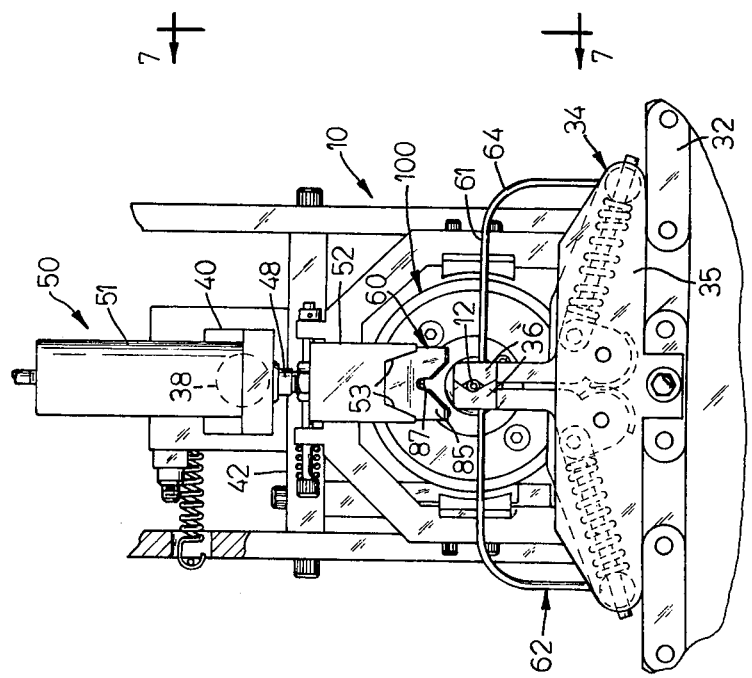
FIG. 4 is an end elevation view taken along line 4—4 in FIG. 3.

As shown specifically in FIGS. 4 and 5, each of the wire grippers 34 comprises a pair of jaws 36 which are pivotable and carried by a support 35 and secured to selected lengths of the conveyor chains 32. The jaws 36 are interconnected so that they swing simultaneously in opposite directions from an open position to the wire gripping position in which they are shown in FIGS. 4-5. The wire gripper jaws 36 are spring biased in a wire gripping position such that an end of the wire 12 extends outwardly from the gripper so that it may be engaged by the stripping mechanism 10.

Figure 3:
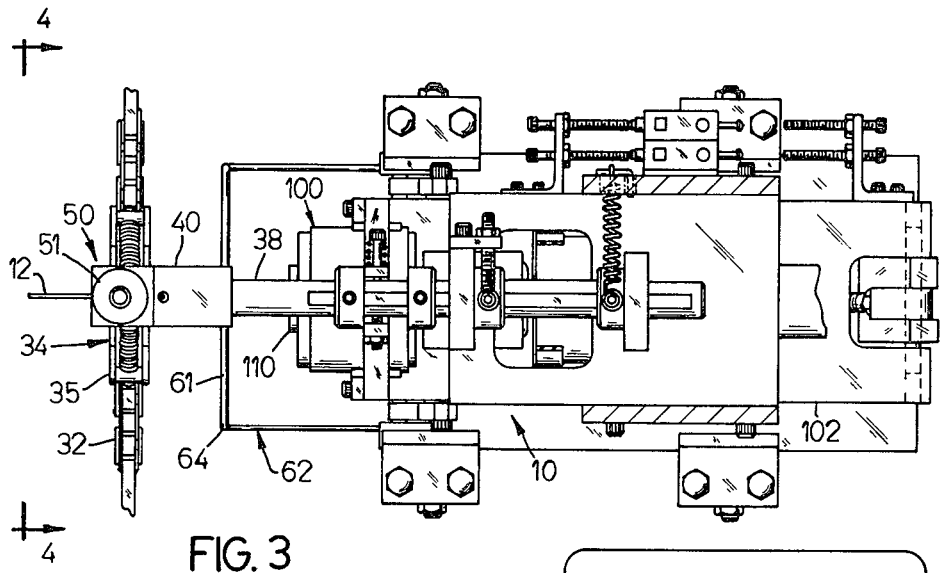
FIG. 3 is a top view of the rotary stripping machine taken along line 3—3 in FIG. 2.
Figure 2:
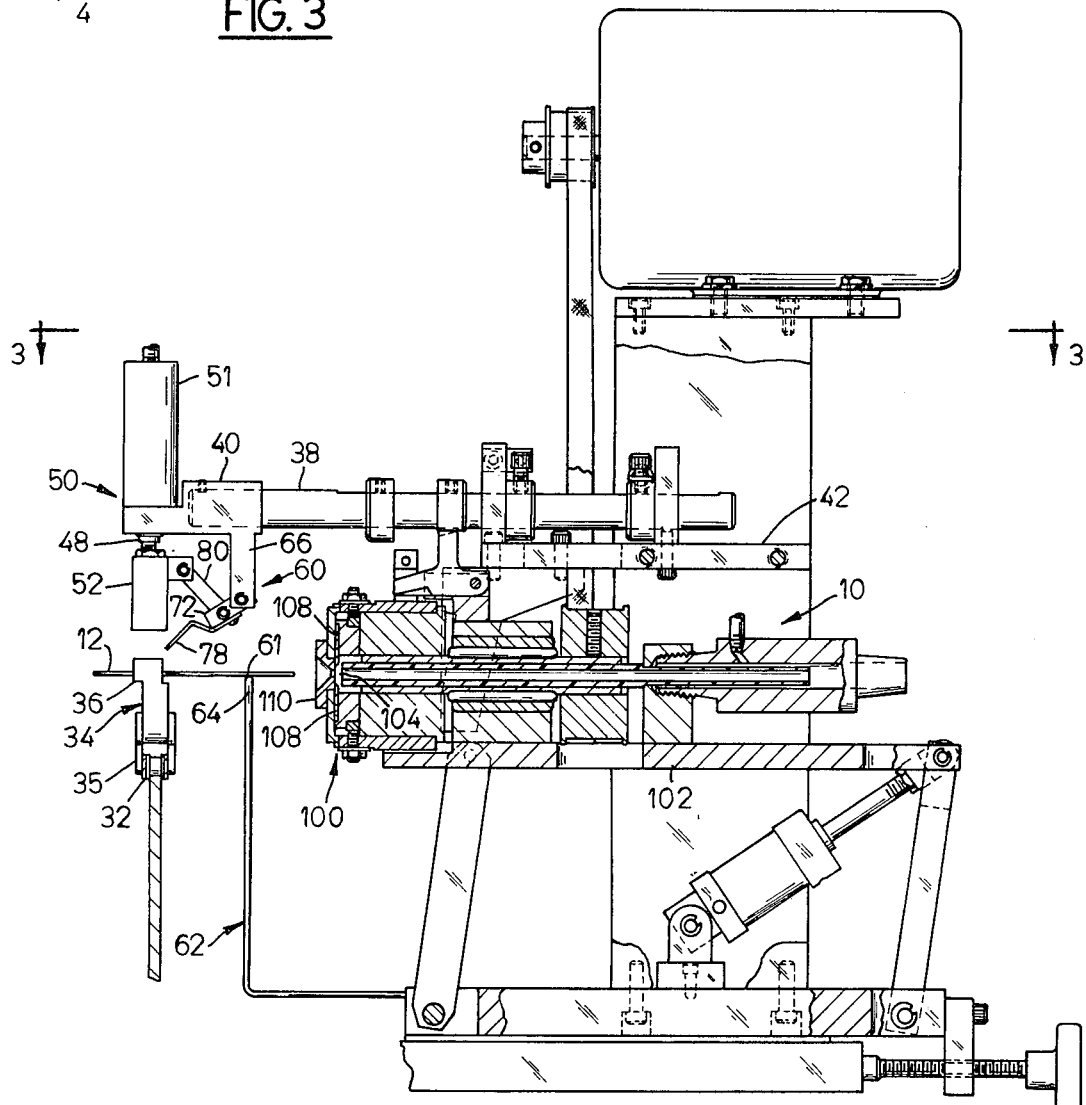
FIG. 2 is a side elevation view of a rotary stripping machine and the wire aligning device showing, the rotary stripping machine shown partly in section for the purpose of clarity.

FIGS. 2 and 3 illustrate the rotary insulation stripping machine 10 which can be used with the present invention. The rotary stripping machine generally includes a rotating head member 100 which is reciprocable on carriage 102 such that it can move from the position shown in FIG. 2 to a position where the end of wire 12 is received within chamber 104. The rotating head 100 includes a pair of radially engageable blades 108 which cut through a predetermined depth of insulation and act to pull the insulation off the end of the wire as the carriage 102 is reciprocated back to the position shown in FIG. 2.

During the operation of such rotary stripping machine the wire may be twisted and pulled in the axial direction in order to remove the insulation from its end. In order to prevent movement of the wire, a clamping mechanism 50, as shown generally in FIG. 2, is provided to force the grippers 36 tightly together to securely lock the wire in position. The clamping mechanism 50 generally comprises a pneumatic actuator 51 having a downwardly movable actuator rod 48 for forcing a clamp 52 downwardly to wedge the grippers 36 securely against wire 12. The clamping mechanism 50 is supported by a journal 40 on the end of a cantilevered shaft 38 rigidly secured at the other end to a mount 42 which is rigidly attached to the conveyor 14. As shown move specifically in FIG. 5, when the pneumatic actuator 51 provides downward clamping force on the clamp 52, the side walls 53 of the clamp 52 each contact one of the grippers 36 to wedge them together such that they secure the wire 12.

As also shown in FIG. 2, the head 100 includes a funnel member 110 which guides the end of the wire 12 into the cutting chamber 104. It is necessary, however, that the wire 12 be relatively straight and in a generally proper alignment if it is to be received within the funnel member 110.

In order to provide means to accurately align the free end of the wire with the funnel, the apparatus shown in FIG. 2–8 includes a wire guide assembly which straightens and positions the free ends of each of the wires 12 being indexed to the stripping station to ensure that they are received within the funnel 110. The assembly includes a pivotably mounted wire guide 60 operable in combination with a lower wire support 62 to ensure accurate alignment of the end of the wire 12.

The function of the wire support 62 can be more clearly understood by reference to FIGS. 2–5. As the wire section 12 is conveyed to the stripping station, if the free end of the wire is bent somewhat downwardly it will contact the curved surface 64 (FIGS. 4–5) of the support 62 such that it will slide onto the upper surface 61 of the support 62 and be maintained in vertical alignment with the funnel 110 and the chamber 104.

The pivotable wire guide 60 is mounted above the wire support 62 to the journal 40 and operably connected for pivotal movement in response to downward movement of the clamp 52. As shown in FIG. 6, the journal 40 attached to the end of the cantilever shaft 38 includes a downwardly extending projection 66 having a pair of spaced arms 68 for pivotably mounting therebetween the pivotable member 72 of the wire guide 60. Both the arms 68 and the member 72 include bores which are aligned so as to receive pivot pin 76. The pivotable member 72 also includes a slot 73 for receiving therein one end of a pivotable linkage arm 80 which is pivotably secured in the slot by pivot pin 81. The linkage arm 80 is pivotably connected at its other end to two projections 82 extending from the clamp member 52 by a pivot pin 83. Thus, downward movement of the clamp 52 caused by air actuator 51 also results in a downward pivotal movement of the wire guide 60 around pivot pin 76. The wire guide 60 also includes a notched member 78 secured to pivotable member 72 by screws 79.

The notched member 78 includes a pair of spaced fingers 84 which define a downwardly opening notch 85 for receiving and aligning the end of the wire 12. The notch 85 has a first portion defined by generally opposed converging surfaces 86. These surfaces 86 function, during the downward pivotal movement of the wire guide 60, to guide the wire 12 into a second notch portion 87 having a width only somewhat larger than the wire.

The operation of the wire guide 60 in conjunction with the clamp assembly 50 and with the wire support 62 is generally shown in FIGS. 7 and 8. As previously stated, as the wire 12 is indexed to the stripping station it is received and supported on the upper surface of the wire support 62 to insure its vertical alignment with the stripping head. It is the function of the wire guide 60 to operate in combination with the wire support 62 to straighten and align the end of the wire if it is bent in a horizontal plane or upwardly. As the clamp 52 is actuated to move downwardly the pivotal linkage 80 connected thereto forces the pivotal member 72 and the wire guide 78 secured thereto to pivot about pin 76 thereby traversing an arcuate path. As the wire guide 60 begins to pivot, the ends of the fingers 84 of the notched member 78 will be spaced on either side of the wire at a position near the grippers 36. Since the fingers first receive the wire near the grippers where it is clamped in place, even though the wire 12 may be substantially bent, it is assured that the wire 12 will be positioned between the fingers 84. As the wire guide 60 continues to pivot downwardly, the wire will be guided by the merging surfaces 86 into the narrow portion 87 of the slot 85, and as the wire guide 78 completes its arcuate movement toward the end of the wire, the narrow slot 87 will slide along the wire straightening it and aligning it with the funnel 110 and the chamber 104. In its final position, as shown in FIG. 8, the narrow slot portion is generally aligned with the center opening of the funnel. As shown in FIG. 8, the wire support 62 and the wire guide 78 thus operate in conjunction to align the wire with the center of the funnel opening.

RESUME

The apparatus of the invention thus provides a means for accurately straightening and aligning the ends of wires with an insulation stripping machine. The invention provides means for aligning the wire even though it may be substantially bent because the wire guide first receives the wire near the gripping mechanism.

The wire guide assembly also operates simultaneously with the wire clamping apparatus and employing the downward movement thereof to facilitate its operation. It therefore results in simplification of the design of the apparatus necessary to clamp the wire in place and to align the end of the wire for stripping since only one actuating means is necessary rather than two.

I claim:

1. A wire guide assembly for use with a wire stripping machine having a stripping mechanism, said machine also having a wire conveying means including gripping means for releasably gripping a generally horizontally disposed insulated wire whereby said wire has a free end, said machine having a vertically movable clamp operable to engage said gripping means to rigidly secure said wire which is held between said gripping means, said assembly including a wire guide pivotably mounted to said wire stripping machine for swinging about a generally horizontal axis, pivotable linkage means connecting said vertically movable clamp with said wire guide, said wire guide including a notched member for receiving said free end, said guide being pivotal in response to vertical movement of said clamp such that said notched member pivots to embrace said wire for aligning said free end for reception by said stripping mechanism.

2. The wire guide assembly set forth in claim 1 further including a wire support means secured to said stripping machine and positioned below said wire guide, said support means having an upper surface for supporting said wire whereby said wire guide and said wire support means align said free end with said stripping machine.

3. A wire guide assembly for use with a wire stripping machine having a stripping mechanism, said machine also having a wire conveying means including gripping means for releasably gripping a generally horizontally disposed insulated wire whereby said wire has a free end, said machine having a fluid actuated vertically movable clamp operable to engage said gripping means to rigidly secure said wire which is held between said gripping means, said assembly including a wire guide pivotably mounted to said wire stripping machine for swinging about a generally horizontal axis, said wire guide assembly being supported in a vertically fixed position and said clamp being vertically movable with respect thereto, pivotable linkage means connecting said vertically movable clamp with said wire guide, said wire guide including a generally downwardly opening notched member for receiving said wire, said guide being pivotal in response to relative downward movement of said clamp with respect to said guide such that said notched member moves in a direction generally parallel to the axis of said wire and embraces said wire for aligning said wire end for reception by said stripping mechanism.

4. The wire guide assembly set forth in claim 3 wherein said wire stripping machine includes a rigidly secured horizontally extending cantilevered shaft for supporting said vertically movable clamp and said wire guide and wherein said linkage means is pivotably connected at one end to said clamp and pivotably connected at its other end to said wire guide such that downward movement of said clamp forces said linkage means to pivot said wire guide about a horizontal axis, away from said clamp and toward said free end.

5. The wire guide assembly set forth in claim 3 wherein said downwardly opening notched member includes a first notch portion having inwardly and upwardly sloping opposed surfaces, said surfaces converging to form a second notch portion having a width sufficient to accommodate said wire, whereby in response to pivotal movement of said wire guide said first notch portion guides said free end into said second notch portion, and said second notched portion aligns said free end with the stripping mechanism.

6. The wire guide assembly set forth in claim 3 further including a wire support means secured to said stripping machine and positioned below said wire guide, said support means having an upper surface for supporting the free end of the wire in vertical alignment with said stripping mechanism.

7. A wire guide assembly for use with a wire stripping machine having a stripping mechanism, a wire conveying means including gripping means for releasably gripping a generally horizontally disposed insulated wire whereby said wire has a free end, and a vertically movable clamp operable to engage said gripping means to rigidly secure said wire which is held between said gripping means, said assembly including a wire support means secured to said stripping machine for supporting said free end in vertical alignment with said mechanism, said assembly further including a wire guide pivotably mounted to said wire stripping machine for swinging about a generally horizontal axis pivotable linkage means connecting said vertically movable clamp with said wire guide, said wire guide including a generally downwardly opening notched member for receiving said wire, said guide being pivotal in response to the downward movement of said clamp such that said member moves in an arcuate path from a position adjacent said clamp wherein said notch receives said wire toward said free end and embraces said wire for aligning said wire end for reception by said stripping mechanism.

8. In a wire stripping machine having a stripping mechanism, a wire conveying means including gripping means for releasably gripping a generally horizontally disposed insulated wire whereby said wire has a free end, and a vertically movable clamp operable to engage said gripping means to rigidly secure said wire which is held between said gripping means for presentation of said wire to said stripping mechanism; the improvement comprising, a wire guide assembly including a wire guide pivotably mounted on said wire stripping machine for shifting generally along and parallel to the axis of said wire, shiftable linkage means connecting said vertically movable clamp with said wire guide, said wire guide including a notched member for receiving said wire free end, said guide being shiftable in response to vertical movement of said clamp such that said notched member shifts to embrace said wire for aligning said free end for reception by said stripping mechanism.

9. The machine set forth in claim 8 further including a wire support means positioned below said wire guide, said support means supporting said wire in cooperation with said wire guide to align said free end with said stripping machine.

* * * * *